(12) United States Patent
Hatanaka et al.

(10) Patent No.: US 10,486,473 B2
(45) Date of Patent: Nov. 26, 2019

(54) PASSENGER VEHICLE PNEUMATIC RADIAL TIRE

(71) Applicant: BRIDGESTONE CORPORATION, Tokyo (JP)

(72) Inventors: Shintaro Hatanaka, Tokyo (JP); Isao Kuwayama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 51 days.

(21) Appl. No.: 15/517,747

(22) PCT Filed: Sep. 8, 2015

(86) PCT No.: PCT/JP2015/004558
§ 371 (c)(1),
(2) Date: Apr. 7, 2017

(87) PCT Pub. No.: WO2016/056168
PCT Pub. Date: Apr. 14, 2016

(65) Prior Publication Data
US 2017/0305199 A1 Oct. 26, 2017

(30) Foreign Application Priority Data
Oct. 8, 2014 (JP) .................................. 2014-207261

(51) Int. Cl.
*B60C 11/00* (2006.01)
*B60C 11/03* (2006.01)
(Continued)

(52) U.S. Cl.
CPC ............ *B60C 11/0332* (2013.01); *B60C 3/04* (2013.01); *B60C 11/0008* (2013.01);
(Continued)

(58) Field of Classification Search
CPC ... B60C 11/032; B60C 11/0332; B60C 11/03; B60C 11/0008; B60C 11/0306;
(Continued)

(56) References Cited

U.S. PATENT DOCUMENTS 3,749,145 A * 7/1973 Hart .................... B60C 11/0306
152/209.22
2013/0048169 A1 2/2013 Erceg et al.
(Continued)

FOREIGN PATENT DOCUMENTS

CN 102963216 A 3/2013
CN 103381741 A 11/2013
(Continued)

OTHER PUBLICATIONS

International Search Report for PCT/JP2015/004558 dated Nov. 17, 2015 [PCT/ISA/210].
(Continued)

*Primary Examiner* — Steven D Maki
*Assistant Examiner* — Philip N Schwartz
(74) *Attorney, Agent, or Firm* — Sughrue Mion, PLLC

(57) ABSTRACT

When a tire is attached to a rim and set to an internal pressure of 250 kPa or more, a ratio SW/OD of the tire is 0.26 or less in the case where SW of the tire is less than 165 (mm), and SW and OD satisfy a relationship 2.135×SW+ 282.3≤OD in the case where SW is 165 (mm) or more. The tread rubber has dynamic storage modulus E' of 6.0 MPa to 12.0 MPa, and loss tangent tan δ of 0.05 to 0.15. In at least one land portion, sipes are arranged with a predetermined pitch length L, and a land portion width W, a tire widthwise sipe component total length Ws of the sipes, the pitch length L, and a tire circumferential sipe component total length Ls of the sipes satisfy relationships 0.4W≤Ws≤1.2W and 0.6L≤Ls≤3L.

9 Claims, 5 Drawing Sheets

(51) Int. Cl.
 *B60C 11/12* (2006.01)
 *B60C 3/04* (2006.01)
(52) U.S. Cl.
 CPC ............ *B60C 11/03* (2013.01); *B60C 11/032* (2013.01); *B60C 11/0306* (2013.01); *B60C 11/1236* (2013.01); *B60C 2011/0016* (2013.01); *B60C 2011/0025* (2013.01); *B60C 2011/0341* (2013.01); *B60C 2011/0353* (2013.01); *Y02T 10/862* (2013.01)
(58) Field of Classification Search
 CPC ......... B60C 11/1236; B60C 2011/0353; B60C 2011/0016; B60C 2011/0341; B60C 2011/0025; B60C 3/04; Y02T 10/862
 See application file for complete search history.

(56) References Cited

U.S. PATENT DOCUMENTS

| | | |
|---|---|---|
| 2013/0292021 A1 | 11/2013 | Tanaka |
| 2014/0290820 A1 | 10/2014 | Hatanaka et al. |
| 2016/0023514 A1 | 1/2016 | Yamamoto et al. |
| 2017/0197465 A1 | 7/2017 | Hatanaka et al. |
| 2017/0197466 A1 | 7/2017 | Hatanaka et al. |

FOREIGN PATENT DOCUMENTS

| | | |
|---|---|---|
| EP | 2 781 372 A1 | 9/2014 |
| JP | 7-40706 A | 2/1995 |
| JP | 9-227720 A | 9/1997 |
| JP | 2003246885 A | 9/2003 |
| JP | 2006-224770 A | 8/2006 |
| JP | 2011025786 A | 2/2011 |
| WO | 2012/176476 A1 | 12/2012 |
| WO | 2013/065319 A1 | 5/2013 |

OTHER PUBLICATIONS

Communication dated Sep. 11, 2017 from the European Patent Office in counterpart application No. 15848807.2.
English abstract of JP WO 2015182153 A1 published Apr. 20, 2017.
English abstract of JP WO 2015182152 A1 published Apr. 20, 2017.
English abstract of JP WO 2014178174 A1 published Feb. 23, 2017.
Communication dated May 29, 2018 from the State Intellectual Property Office of the P.R.C. in counterpart Chinese application No. 201580052463.5.

* cited by examiner

PASSENGER VEHICLE PNEUMATIC RADIAL TIRE

CROSS REFERENCE TO RELATED APPLICATIONS

This application is a National Stage of International Application No. PCT/JP2015/004558, filed on Sep. 8, 2015, which claims priority from Japanese Patent Application No. 2014-20726, filed on Oct. 8, 2014, the contents of all of which are incorporated herein by reference in their entirety.

TECHNICAL FIELD

The disclosure relates to a passenger vehicle pneumatic radial tire.

BACKGROUND

Conventional vehicles until around 1960 were lightweight and did not required to have high cruising speed, and so bias tires of low load and narrow sectional width were used. Currently, wider radial tires have been increasingly developed for heavier and faster vehicles (for example, JP H7-40706 A (PTL 1)).

Wider tires, however, strain the vehicle space and lower the vehicle ride comfort. Besides, an increase in air resistance causes lower fuel efficiency.

Growing concern about environmental issues in recent years has enhanced the demand for high fuel efficiency. High fuel efficiency can be assessed based on rolling resistance (RR). Lower rolling resistance is known to contribute to higher fuel efficiency.

It is known that increasing the diameter and width of a tire is effective in reducing the rolling resistance coefficient (RRC) of the tire to achieve higher fuel efficiency. However, when the tire is increased in diameter and width, the tire weight and the air resistance increase. This causes higher vehicle resistance and makes it impossible to achieve sufficient rolling resistance reduction effect, and also leads to excessive load capacity of the tire.

In view of this problem, we have proposed a technique of a passenger vehicle pneumatic radial tire of narrow width (narrow tire width) and large diameter (large tire outer diameter) in which the internal pressure, sectional width (SW), and outer diameter (OD) of the tire satisfy a specific relationship (for example, WO 2012/176476 A1 (PTL 2)).

CITATION LIST

Patent Literatures

PTL 1: JP H7-40706 A
PTL 2: WO 2012/176476 A1

SUMMARY

Technical Problem

Given that, for such a narrow-width, large-diameter radial tire, there has been room for examination in wet performance for which braking performance on a wet road surface serves as an index, we have studied adjusting the dynamic storage modulus E' of the tread rubber of the radial tire at 30° C. to improve wet performance, and discovered that wet performance can be improved by adjusting the dynamic storage modulus E' to a predetermined range. Even in the case of adjusting the dynamic storage modulus E' to the predetermined range, however, there has still been a need to further improve wet performance and rolling resistance performance.

It could therefore be helpful to provide a passenger vehicle pneumatic radial tire that achieves improved wet performance and rolling resistance performance in a narrow-width, large-diameter radial tire.

Solution to Problem

A passenger vehicle pneumatic radial tire according to the disclosure is a passenger vehicle pneumatic radial tire comprising: a carcass composed of a carcass ply of a radially arranged cord toroidally extending between a pair of bead portions; a tread rubber provided on a tire radial outer side of the carcass; at least two circumferential main grooves continuously extending in a tire circumferential direction in a tread surface; and a plurality of land portions in the tread surface, each of which is defined by adjacent two circumferential main grooves of the at least two circumferential main grooves or by a tire widthwise outermost circumferential main groove of the at least two circumferential main grooves and a tread ground contact edge, wherein when the tire is attached to a rim and set to an internal pressure of 250 kPa or more, a ratio SW/OD between a sectional width SW and an outer diameter OD (mm) of the tire is 0.26 or less in the case where the sectional width SW of the tire is less than 165 (mm), and the sectional width SW and the outer diameter OD (mm) of the tire satisfy a relationship $$2.135 \times SW + 282.3 \leq OD$$

in the case where the sectional width SW of the tire is 165 (mm) or more, the tread rubber has dynamic storage modulus E' at 30° C. of 6.0 MPa to 12.0 MPa, and loss tangent tan δ at 60° C. of 0.05 to 0.15, and in at least one of the plurality of land portions, a plurality of sipes are arranged with a predetermined pitch length L (mm) measured along the tire circumferential direction, and a land portion width W (mm) of the land portion, a tire widthwise sipe component total length Ws (mm) of the sipes within one pitch area of the pitch length L (mm) in the land portion, the pitch length L (mm), and a tire circumferential sipe component total length Ls (mm) of the sipes within one pitch area of the pitch length L (mm) in the land portion satisfy relationships $$0.4W \leq Ws \leq 1.2W \text{ and } 0.6L \leq Ls \leq 3L.$$

With this structure, improved wet performance and rolling resistance performance in a narrow-width, large-diameter radial tire can be achieved.

In the disclosure, the "sectional width SW" and "outer diameter OD" of the tire are respectively the sectional width and outer diameter defined in JIS D 4202-1994, in the state where the tire is attached to the rim, set to an internal pressure of 250 kPa or more, and placed under no load.

The "rim" is an approved rim ("measuring rim" in ETRTO Standards Manual, "design rim" in TRA Year Book) in applicable size that is described or will be described in the future in an effective industrial standard in areas where tires are produced or used, such as JATMA (Japan Automobile Tyre Manufacturers Association) Year Book in Japan, ETRTO (European Tyre and Rim Technical Organisation) Standards Manual in Europe, or TRA (Tire and Rim Association, Inc.) Year Book in the United States (the "rim" includes not only current size but also a size that may be included in the industrial standard in the future. An example of the "size that will be described in the future" is the size described as "future developments" in ETRTO Standards Manual 2013). In the case of a size not described in the industrial standard, the "rim" refers to a rim whose width corresponds to the bead width of the tire.

In the disclosure, the dynamic storage modulus E' (MPa) and the loss tangent tan δ (the ratio (E"/E') between the dynamic loss modulus (E") and the dynamic storage modulus (E')) are values measured for vulcanized rubber by applying an initial load of 160 g to a test piece of 2 mm in thickness, 5 mm in width, and 20 mm in length under the conditions of an initial strain of 1% and a vibration frequency of 50 Hz. The dynamic storage modulus E' is a value measured at a temperature of 30° C. (hereafter also referred to as "dynamic storage modulus E' at 30° C." or simply "dynamic storage modulus E'"), unless otherwise noted. The loss tangent tan δ is a value measured at a temperature of 60° C. (hereafter also referred to as "loss tangent tan δ at 60° C." or simply "loss tangent tan δ"), unless otherwise noted.

In the disclosure, the "tread rubber" means rubber that does not include members such as belts optionally included in the tread.

In the disclosure, the "sipe" is a sipe whose opening width to the tread surface is 1.5 mm or less, in the state where the tire is attached to the rim, set to an internal pressure of 30 kPa which is such pressure that maintains the tire shape, and placed under no load (hereafter the "state where the tire is attached to the rim, set to an internal pressure of 30 kPa which is such pressure that maintains the tire shape, and placed under no load" is also referred to as "low-pressure no-load state"). The dimensions, etc. of each element of the tread surface are measured on a developed view of the tread surface in the low-pressure no-load state, unless otherwise noted.

In the disclosure, the "pitch length L" is the length from one tire circumferential end of one sipe to the corresponding tire circumferential end of a sipe adjacent to the sipe in the tire circumferential direction, measured along the tire circumferential direction on a developed view. The "land portion width W" is the length of the land portion measured along the tire width direction. The "tire widthwise sipe component total length Ws of the sipes within one pitch area of the pitch length L in the land portion" is the length measured along the tire width direction by projecting, in the tire circumferential direction, the sipes within one pitch area of the pitch length L in the land portion. In the case where, when projecting the sipe(s) within this area in the tire circumferential direction, there is an overlapping portion of the projected sipe(s) as, for example, in the case where a plurality of sipes are present or a sipe bends, the length is calculated by multiplying the overlapping portion by the number of elements overlapping each other. The "tire circumferential sipe component total length Ls of the sipes within one pitch area of the pitch length L in the land portion" is the length measured along the tire circumferential direction by projecting, in the tire width direction, the sipes within one pitch area of the pitch length L in the land portion. As with the "tire widthwise sipe component total length Ws", in the case where there is an overlapping portion of the projected sipe(s), the length is calculated by multiplying the overlapping portion by the number of elements overlapping each other.

Preferably, in the passenger vehicle pneumatic radial tire according to the disclosure, the land portion width W (mm), the tire widthwise sipe component total length Ws (mm), the pitch length L (mm), and the tire circumferential sipe component total length Ls (mm) satisfy relationships $0.6W \leq Ws \leq 1.2W$ and $L \leq Ls \leq 3L$.

With this structure, wet performance can be further improved.

Preferably, in the passenger vehicle pneumatic radial tire according to the disclosure, in the land portion in which the sipes are arranged, at least one small hole is provided within one pitch area of the pitch length L (mm), and an opening area S (mm$^2$) of the small hole to the tread surface is $0.1 \leq S \leq 4$.

With this structure, wet performance can be further improved.

In the disclosure, the "small hole" is a hole that extends from within the tread and is open to the tread surface. In the case where a plurality of small holes are arranged within one pitch area of the pitch length L (mm), the average value of the plurality of small holes is used.

Preferably, in the passenger vehicle pneumatic radial tire according to the disclosure, in the land portion in which the sipes are arranged, the pitch length L (mm) and the number N of small holes provided within one pitch area of the pitch length L (mm) satisfy a relationship $0.1 \leq N/L \leq 0.3$.

With this structure, wet performance can be further improved.

Advantageous Effect

It is thus possible to provide a passenger vehicle pneumatic radial tire that achieves improved wet performance and rolling resistance performance in a narrow-width, large-diameter radial tire.

DETAILED DESCRIPTION

The following illustrates and describes a passenger vehicle pneumatic radial tire (hereafter also simply referred to as "tire") according to one of the disclosed embodiments in detail, with reference to drawings. The following description and drawings are an example for describing the tire according to the disclosure, and the disclosure is not limited to the following description and drawings.

Figure 1:
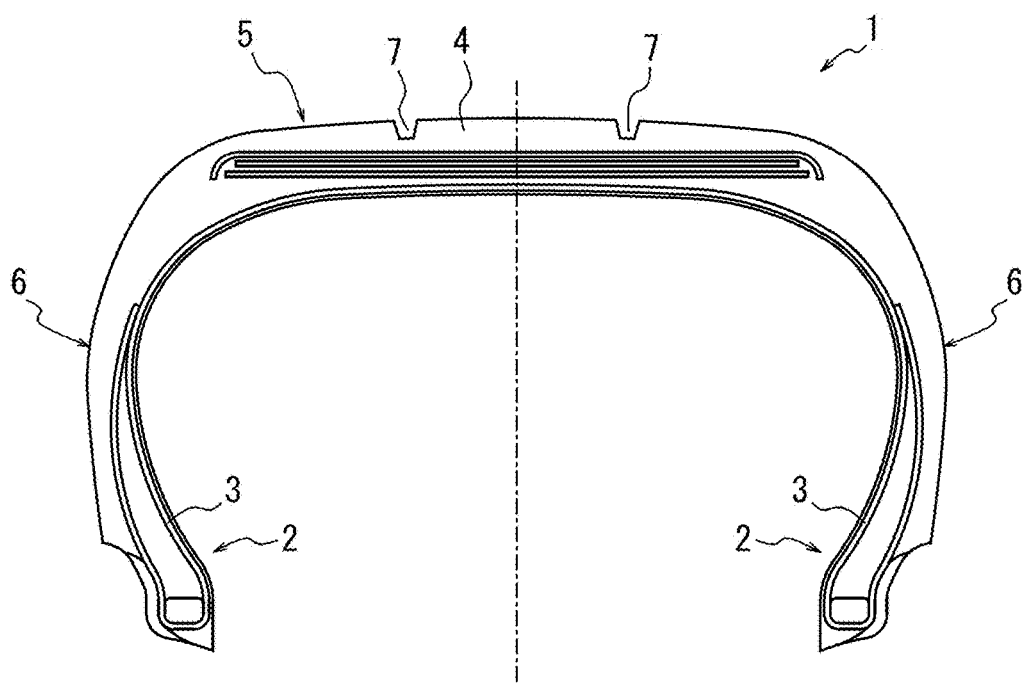
FIG. 1 is a tire widthwise cross-sectional view illustrating a passenger vehicle pneumatic radial tire according to one of the disclosed embodiments.

For example, a tire 1 according to the disclosure includes: a carcass 3 composed of one or more carcass plies of radially arranged cords toroidally extending between a pair of bead portions 2; and a tread rubber 4 provided on the tire radial outer side of the carcass 3, as illustrated in the tire widthwise cross-sectional view in FIG. 1.

In more detail, the tire 1 includes: a tread portion 5; a pair of sidewall portions 6 continuously extending from the sides of the tread portion 5 inward in the tire radial direction; the bead portions 2 continuous from the tire radial inner ends of the respective sidewall portions 6; and the carcass 3 composed of one or more carcass plies toroidally extending between the pair of bead portions 2 and reinforcing each portion. A bead core is buried in each bead portion 2. A rubber chafer is provided on the outer surface of each bead portion 2, as a reinforcement member of the bead portion 2. A belt composed of one or more belt plies is provided in the crown portion of the carcass 3. The tread rubber 4 is located on the tire radial outer side of the crown portion of the carcass 3.

In the state where the tire 1 is attached to the rim, set to an internal pressure of 250 kPa or more, and placed under no load, the ratio SW/OD between the sectional width SW (mm) and outer diameter OD (mm) of the tire 1 is 0.26 or less in the case where the sectional width SW of the tire 1 is less than 165 (mm), and the sectional width SW (mm) and outer diameter OD (mm) of the tire 1 satisfy the relationship $$2.135 \times SW + 282.3 \leq OD$$

in the case where the sectional width SW of the tire 1 is 165 (mm) or more. The tire 1 satisfying this relationship has a narrow-width, large-diameter shape. Thus, the tire 1 can be improved in rolling resistance performance (reduced in rolling resistance coefficient), and reduced in weight.

The internal pressure during rolling of the tire 1 is preferably 250 kPa or more, and more preferably 250 kPa to 350 kPa.

From the viewpoint of reducing the rolling resistance coefficient of the tire 1 and reducing the weight of the tire 1, in the case where the internal pressure during rolling of the tire 1 is 250 kPa or more, the sectional width SW (mm) and outer diameter OD (mm) of the tire 1 are preferably $-0.0187 \times SW^2 + 9.15 \times SW - 380 \leq OD$.

In the tire 1, the dynamic storage modulus E' of the tread rubber 4 at 30° C. is 6.0 MPa to 12.0 MPa. By limiting the dynamic storage modulus E' of the tread rubber 4 to this specific range in the narrow-width, large-diameter radial tire 1, the wet coefficient of friction µ can be improved, with it being possible to improve wet performance. In addition, by limiting the dynamic storage modulus E' in this way, cornering power during cornering is improved to enhance steering stability. From the same viewpoint, the dynamic storage modulus E' is preferably 7.9 MPa to 12.0 MPa, and more preferably 8.0 MPa to 11.0 MPa.

The loss tangent tan δ of the tread rubber 4 at 60° C. is 0.05 to 0.15. This improves rolling resistance performance.

The tread rubber 4 can be formed by kneading and vulcanizing, according to a conventional method, a rubber composition including a conventionally known rubber component and optionally including a conventionally known filler, age resistor, vulcanizing agent, vulcanization accelerator, process oil, anti-scorch agent, zinc oxide, stearic acid, etc.

The kneading condition is not particularly limited. A Banbury mixer, a roll, an internal mixer, or the like may be used, and the rotor rotational velocity, the ram pressure, the kneading temperature, and the kneading time may be adjusted as appropriate depending on the formulation, the introduction volume to the kneading device, etc.

As the conditions when vulcanizing the rubber composition, the vulcanization temperature may be 100° C. to 190 CC as an example, and the vulcanization time may be 5 minutes to 80 minutes as an example.

Examples of the rubber component of the tread rubber 4 include modified or unmodified synthetic rubbers such as styrene-butadiene copolymer rubber (SBR), butadiene rubber (BR), polyisoprene rubber (IR), isobutylene isoprene rubber (IIR), halogenated butyl rubber, styrene-isoprene copolymer rubber (SIR), and chloroprene rubber (CR), and natural rubber (NR).

The method of modifying a conjugated diene-based polymer such as SBR or BR is not particularly limited, and may be a conventionally known method. For example, the method described in WO 2008/050845 A1 (the method of causing a modifier to react with the active terminal of the conjugated diene-based polymer and, in the presence of a titanium-based condensation accelerator, performing condensation reaction involving the modifier) may be used.

Preferable examples of the conjugated diene-based polymer include a copolymer of 1,3-butadiene and styrene.

Preferable examples of the modifier include N,N-bis(trimethylsilyl)aminopropylmethyldimethoxysilane, N,N-bis(trimethylsilyl)aminopropylmethyldiethoxysilane, and 1-trimethylsilyl-2-ethoxy-2-methyl-1-aza-2-silacyclopentane.

Preferable examples of the titanium-based condensation accelerator include tetrakis(2-ethyl-1,3-hexanediolato)titanium, tetrakis(2-ethylhexyloxy)titanium, and titanium di-n-butoxide(bis-2,4-pentanedionate).

These rubber components may be used singly or in combination of two or more types.

Examples of the filler include conventionally known carbon black, silica, calcium carbonate, talc, and clay. These fillers may be used singly or in combination of two or more types.

Preferably, in the tire 1 according to the disclosure, the rubber composition forming the tread rubber 4 includes at least the rubber component and the filler, and the content of the filler is 50 parts to 100 parts by mass with respect to 100 parts by mass the rubber component in the rubber composition. This has the advantage of excellent wear resistance and processability. From the viewpoint of wear resistance and processability, the content of the filler is more preferably 55 parts to 85 parts by mass and further preferably 75 parts to 85 parts by mass with respect to 100 parts by mass the rubber component. The content of the filler is more preferably 50 parts to 90 parts by mass with respect to 100 parts by mass the diene-based polymer (diene-based rubber).

Preferably, in the tire 1 according to the disclosure, the filler includes silica, and the content of silica is 25 parts to 100 parts by mass with respect to 100 parts by mass the rubber component. This has the advantage of excellent wet performance. From the viewpoint of wet performance, the content of silica is more preferably 50 parts to 75 parts by mass and further preferably 60 parts to 75 parts by mass with respect to 100 parts by mass the rubber component.

In the case of using silica as the filler, silica may be processed using a silane coupling agent.

To set E' to 6.0 MPa to 12.0 MPa as mentioned above, for example, the formulation may be changed for modified S-SBR in the range of 20 phr to 70 phr in 100 phr the diene-based polymer, and for silica in the range of 30 phr to 80 phr in 50 phr to 80 phr the filler.

To set tan δ to 0.05 to 0.15 as mentioned above, for example, the formulation may be changed for NR in the range of 0 phr to 20 phr and for modified S-SBR in the range of 20 phr to 70 phr in 100 phr the diene-based polymer, and for silica in the range of 30 phr to 80 phr in 50 phr to 80 phr the filler.

In this description, "phr" is the content (parts by mass) of each component with respect to 100 parts by mass the rubber component.

Figure 2:
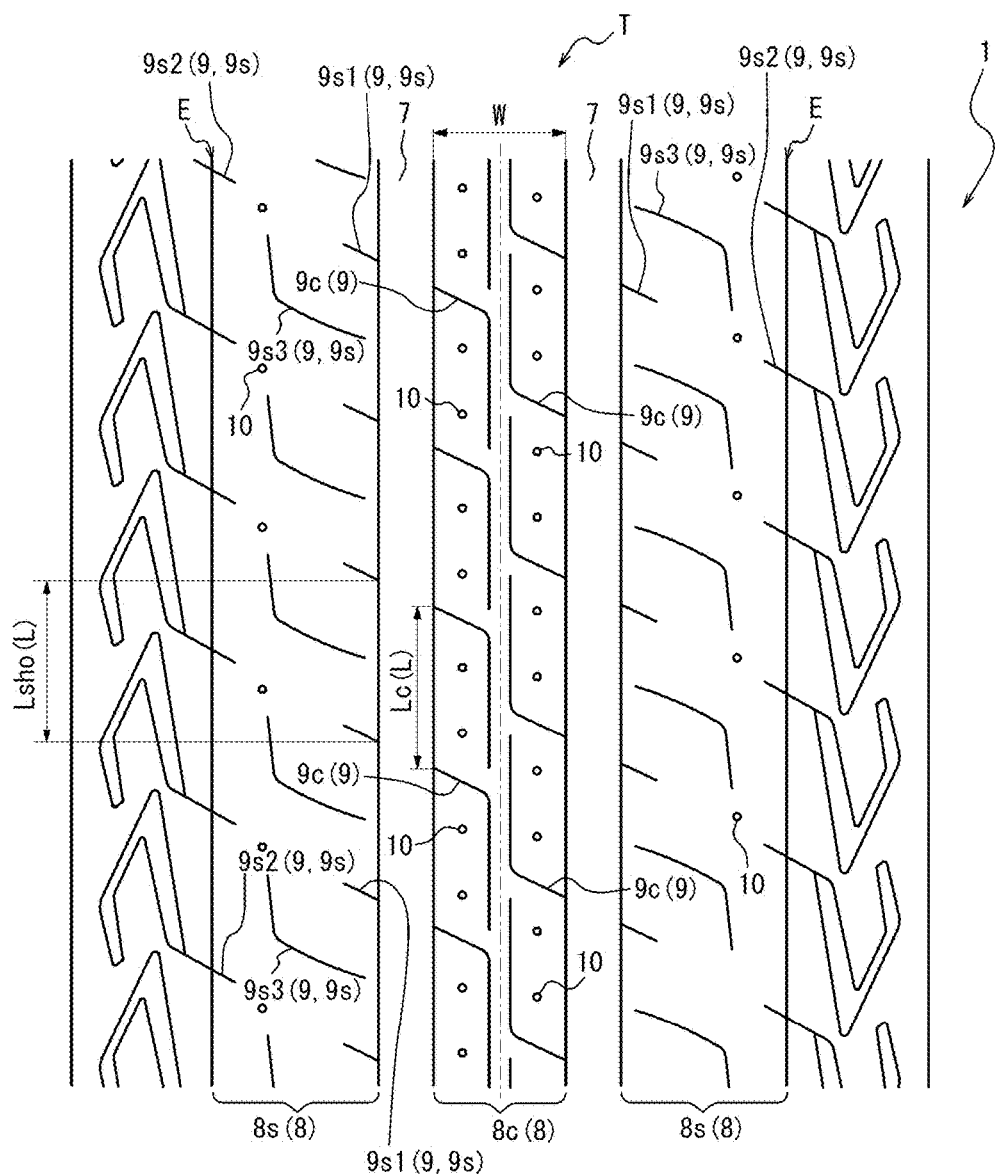
FIG. 2 is a developed view illustrating the tread pattern of the tire illustrated in FIG. 1.
Figure 5:
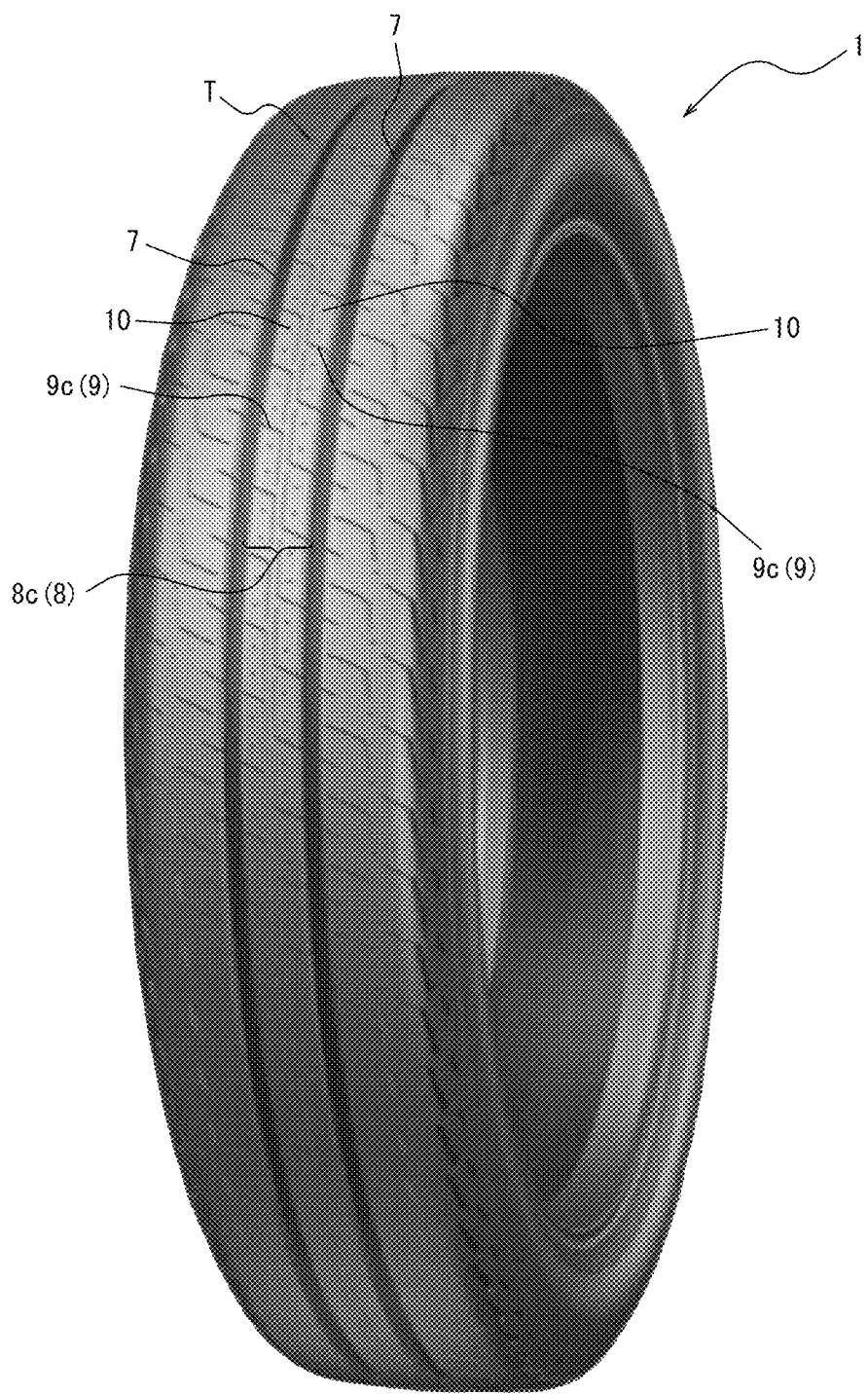
FIG. 5 is a perspective view of the tire illustrated in FIG. 1.

In this embodiment illustrated in FIGS. 2 and 5, at least two circumferential main grooves 7 continuously extending in the tire circumferential direction are provided in the tread surface T. Although two circumferential main grooves 7 continuously extending linearly along the tire circumferential direction on the developed view are illustrated in the drawings, three or more circumferential main grooves 7 may be provided. Although the circumferential main grooves 7 illustrated in FIGS. 2 and 5 extend linearly along the tire circumferential direction, the circumferential main grooves 7 may extend in a zigzag shape, wavy shape, or the like, as long as they continuously extend in the tire circumferential direction.

In this embodiment, a land portion 8 defined by adjacent two circumferential main grooves 7 is located on the center side of the tread surface T, and a land portion 8 defined by each tire widthwise outermost circumferential main groove 7 of the circumferential main grooves 7 and the corresponding tread ground contact edge E is located on the shoulder side of the tread surface T. In the illustrated example where two circumferential main grooves 7 are provided, a land portion (hereafter also referred to as "center land portion") 8c defined by the two circumferential main grooves 7 is located on the tire center side of the tread surface T, and a land portion (hereafter also referred to as "shoulder land portion") 8s defined by each circumferential main groove 7 and the corresponding tread ground contact edge E is located on the tire shoulder side of the tread surface T.

In this embodiment, a plurality of sipes 9 are arranged with a predetermined pitch length L measured along the tire circumferential direction, in at least one of the plurality of land portions 8, e.g. in each of the center land portion 8c and two shoulder land portions 8s in the illustrated example.

In detail, in the illustrated example, the center land portion 8c has two rows of center sipes 9c each of which includes: a tire widthwise portion that extends from the corresponding one of the circumferential main grooves 7 defining the center land portion 8c while inclining with respect to the tire width direction and terminates within the land portion 8c; and a tire circumferential portion that extends in the tire circumferential direction from the end of the tire widthwise portion within the land portion 8c. The center sipes 9c are arranged with the pitch length L (hereafter the pitch length of the center sipes 9c is referred to as "pitch length Lc"). The center sipes 9c of the two rows differ in position from each other in the tire circumferential direction, and are point-symmetric.

Each shoulder land portion 8s has first shoulder sipes 9s1 and second shoulder sipes 9s2, where the corresponding first shoulder sipe 9s1 and second shoulder sipe 9s2 extend substantially collinearly respectively from the circumferential main groove 7 and the tread ground contact edge E defining the shoulder land portion 8s while inclining with respect to the tire width direction and terminate within the land portion 8s. Each shoulder land portion 8s also has third shoulder sipes 9s3 each of which includes: a tire widthwise portion that extends in a direction inclining with respect to the tire width direction and substantially parallel to the first shoulder sipe 9s1 and the second shoulder sipe 9s2; and a tire circumferential portion that extends substantially in the tire circumferential direction from the tire widthwise outer end of the tire widthwise portion and terminates within the land portion 8s. The tire widthwise portion of each third shoulder sipe 9s3 is located substantially at the center between the first shoulder sipes 9s1 adjacent in the tire circumferential direction and between the second shoulder sipes 9s2 adjacent in the tire circumferential direction.

The first shoulder sipes 9s1, the second shoulder sipes 9s2, and the third shoulder sipes 9s3 are each arranged with the pitch length L (hereafter the pitch length of these shoulder sipes is referred to as "pitch length Lsho"). The shoulder sipes 9s arranged in the two shoulder land portions 8s differ in position from each other in the tire circumferential direction, and are point-symmetric.

In the illustrated example, the tire widthwise portion of the center sipe 9c in the center land portion 8c and the first shoulder sipe 9s1 and the second shoulder sipe 9s2 in each shoulder land portion 8s are substantially collinear.

Since the tire 1 includes the aforementioned tread rubber 4, shearing rigidity in the tire circumferential direction (circumferential shearing rigidity) and compression rigidity in the tire radial direction increase to thus improve wet performance and rolling resistance performance. However, there has still been a need to further improve wet performance.

As a result of conducting intensive study to further improve wet performance, we discovered the following. The inclusion of the aforementioned tread rubber increases circumferential shearing rigidity and contributes to a higher adhesion limit, so that wet performance can be improved. However, the simultaneous increase in compression rigidity tends to cause a decrease in actual road footprint area when the tire 1 comes into contact with the road surface, and thus cancel out the effect of improving wet performance by the increase in circumferential shearing rigidity.

Accordingly, in this embodiment, in at least one of the plurality of land portions 8, e.g. the center land portion 8c in the illustrated example, the plurality of sipes 9 are arranged with the pitch length Lc (mm) as mentioned above, and the land portion width W (mm) of the land portion 8, the tire widthwise sipe component total length Ws (mm) of the sipes 9 within one pitch area of the pitch length Lc (mm) in the land portion, the pitch length Lc (mm), and the tire circumferential sipe component total length Ls (mm) of the sipes 9 within one pitch area of the pitch length Lc (mm) in the land portion satisfy the relationships $$0.4W \leq Ws \leq 1.2W \text{ and } 0.6Lc \leq Ls \leq 3Lc.$$

With this structure, while maintaining the adhesion limit by suppressing a decrease in circumferential shearing rigidity, compression rigidity can be reduced to improve the actual road footprint area. Wet performance can thus be improved. In detail, drainage performance can be improved by setting the tire widthwise sipe component total length Ws (mm) within one pitch area of the pitch length Lc (mm) to be 0.4 times or more the land portion width W (mm), and a decrease in circumferential shearing rigidity can be suppressed by setting the tire widthwise sipe component total length Ws (mm) within one pitch area of the pitch length Lc (mm) to be 1.2 times or less the land portion width W (mm). Moreover, compression rigidity can be sufficiently reduced by setting the tire circumferential sipe component total length Ls (mm) within one pitch area of the pitch length Lc (mm) to be 0.6 times or more the pitch length Lc (mm), and cornering power can be sufficiently maintained by setting the tire circumferential sipe component total length Ls (mm) within one pitch area of the pitch length Lc (mm) to be 3 times or less the pitch length Lc (mm). A decrease in steering stability can be suppressed in this way. The inclusion of the aforementioned tread rubber 4 contributes to higher cornering power than a tire including a typical tread rubber, and thus improves steering stability. Since steering stability is favorable, a decrease in steering stability can be suppressed even when the tire circumferential sipe component Ls is increased.

The sipe 9 having the tire widthwise component, when running on a wet road surface, takes in the water between the tread surface and the road surface more easily than a sipe having no tire widthwise component. In addition, if the sipe 9 is open to the circumferential main groove 7, the water is drained to the circumferential main groove 7. Drainage performance can thus be improved.

From the same viewpoint, the land portion width W (mm), the tire widthwise sipe component total length Ws (mm), the pitch length L (mm), and the tire circumferential sipe component total length Ls (mm) preferably satisfy the relationships $$0.6W \leq Ws \leq 1.2W \text{ and } L \leq Ls \leq 3L.$$

In this embodiment, only the center sipes 9c arranged with the pitch length Lc in the center land portion 8c satisfy the aforementioned predetermined relational expressions. From the viewpoint of maintaining cornering power, however, not only the sipes in the center land portion 8c but also the sipes in another land portion 8, e.g. the shoulder sipes 9s arranged with the pitch length Lsho in the shoulder land portion 8s in this embodiment, may satisfy the aforementioned predetermined relational expressions.

The following description concerns the center land portion 8c as an example of the land portion 8 where the sipes 9 are arranged with the pitch length L and the tire widthwise sipe component total length Ws and tire circumferential sipe component total length Ls of the sipes 9 are prescribed. Prescribing the sipes 9 as mentioned above is, however, not limited to the center sipes 9c in the center land portion 8c, and may be applied to another land portion 8, e.g. the shoulder sipes 9s arranged in the shoulder land portion 8s in this embodiment, instead of the center sipes 9c.

In this embodiment, in the center land portion 8c, the tire circumferential sipe component total length of the sipes 9 on the whole tire outer circumference surface is preferably more than the tire widthwise sipe component total length of the sipes 9 on the whole tire outer circumference surface. With this structure, the compression rigidity of the tire as a whole can be reduced, with it being possible to sufficiently improve wet performance.

In the center land portion 8c, the pitch length Lc of the center sipes 9c is preferably 0.5% to 3.0% of the tire circumferential length of the center land portion 8c at the center in the width direction, and more preferably 1.0% to 2.5% of the tire circumferential length of the center land portion 8c at the center in the width direction. The land portion width W of the center land portion 8c is preferably 15% to 35% of the tread width, and more preferably 18% to 22% of the tread width.

Here, the "tire circumferential length" is the length measured in the low-pressure no-load state. The "tread width" is the length between both tread ground contact edges E measured along the tire width direction, in the state where the tire 1 is attached to the aforementioned rim and set to an internal pressure of 250 kPa or more. The "tread ground contact edge" is the outermost position of the tread surface T in the tread width direction. The "tread surface" is the outer circumferential surface of the whole tire 1 that comes into contact with the road surface when the tire 1 is rolled in the state where the tire 1 is attached to the aforementioned rim, set to an internal pressure of 250 kPa or more, and placed under a load of 75% of the maximum load capacity.

In this embodiment, in the center land portion 8c, at least one small hole 10 is preferably provided within one pitch area of the pitch length Lc (mm), where the opening area S (mm$^2$) of the small hole 10 to the tread surface is in the range of $0.1 \leq S \leq 4$.

In the illustrated example, two small holes 10 are arranged in the land portion surrounded by the tire widthwise portion and tire circumferential portion of the center sipe 9c and the adjacent center sipe 9c in the tire circumferential direction, in the center land portion 8c.

In this embodiment, similar small holes 10 are also arranged in the two shoulder land portions 8s in which the shoulder sipes 9s are arranged. In detail, one small hole 10 is provided substantially on the extended line of each of the first shoulder sipe 9s1, the second shoulder sipe 9s2, and the tire circumferential portion of the third shoulder sipe 9s3.

With this structure, compression rigidity can be further reduced while maintaining circumferential shearing rigidity, with it being possible to further improve wet performance. In the center land portion 8c, if only the center sipes 9c are present, for example, a block-shaped portion surrounded by the center sipes 9c is formed in the land portion 8c. By providing the aforementioned small hole 10 in such a block-shaped portion, however, compression rigidity can be reduced uniformly.

The cross-sectional area S of the small hole 10 is 0.1 mm$^2$ or more, so that compression rigidity can be reduced sufficiently. The cross-sectional area S of the small hole 10 is 4 mm$^2$ or less, so that a decrease in land portion area of the land portion 8 is prevented to prevent a decrease in wet performance improvement effect caused by a decrease in actual footprint area. The provision of the small hole 10 can cause increased strain energy loss due to increased deformation of the land portion 8 around the small hole 10. Such an increase, however, can be suppressed because the small hole 10 is small in size. Moreover, adding the small hole 10 reduces the volume of the land portion 8, thus canceling out increased strain energy loss. As a result, a decrease in rolling resistance can be prevented.

Although the number of small holes 10 in the center land portion 8c is not particularly limited, the relationship between the pitch length Lc (mm) and the number N of small holes 10 within one pitch area of the pitch length Lc (mm) is preferably $0.1 \leq N/Lc \leq 0.3$. This further improves wet performance. In detail, by setting N/Lc (number/mm) to 0.1 or more, compression rigidity can be reduced sufficiently. By setting N/Lc (number/mm) to 0.3 or less, a decrease in area of the land portion 8 can be prevented and also a decrease in cornering power can be prevented.

The depth of each of the sipe 9 and small hole 10 is preferably 2 mm to 4 mm. In this way, compression rigidity can be reduced sufficiently from the initial to last stages of wear of the tire 1. The depth of the circumferential main groove 7 is more than the depth of each of the sipe 9 and small hole 10, and may be 5.0 mm to 9.0 mm.

In this embodiment, preferably, no groove across the land portion 8 is formed in at least the center land portion 8c of the plurality of land portions 8, More preferably, no such groove is formed in any of the land portions 8. The "groove" mentioned here means a groove whose opening width to the tread surface T is more than 1.5 mm from one end through to the other end, in the low-pressure no-load state.

Figure 3:
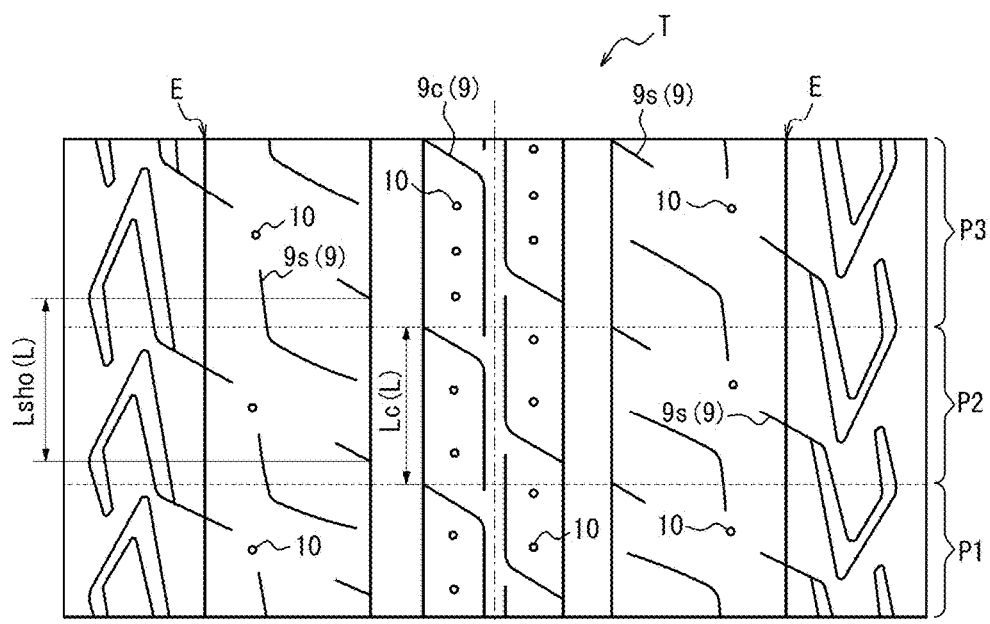
FIG. 3 is a developed view illustrating a tread pattern in which the sipe pitch in the tread pattern of the tire illustrated in FIG. 2 is changed.

In this embodiment, a pattern in which the pitch length L of the sipes 9 is changed on the tire circumference may be used, as illustrated in FIG. 3. In detail, the tread pattern illustrated in FIG. 3 is made up of patterns P1 to P3 in each of which the pitch length L of the sipes 9 (center sipes 9c and shoulder sipes 9s) is changed, while, at least in the center land portion 8c, the center sipes 9c arranged with the pitch length Lc (mm) satisfy 0.4W≤Ws≤1.2W and 0.6Lc≤Ls≤3Lc in all of the patterns P1 to P3. The pitch length increases relatively in the order of the patterns P1 to P3. In the tread pattern illustrated in FIG. 3, the patterns P1 to P3 alternate on the tire circumference. In the patterns P1 and P2, two small holes 10 are provided within one pitch area of the pitch length L (mm). In the pattern P3, on the other hand, three small holes 10 are provided within one pitch area of the pitch length L (mm).

Although three patterns that differ in the pitch length L are illustrated in the example in FIG. 3, two patterns or four or more patterns may be used. Although the patterns P1 to P3 alternate in the example in FIG. 3, the patterns may be arranged in any order. For example, a plurality of repetitions of one pattern may be followed by one or more repetitions of another pattern.

Figure 4:
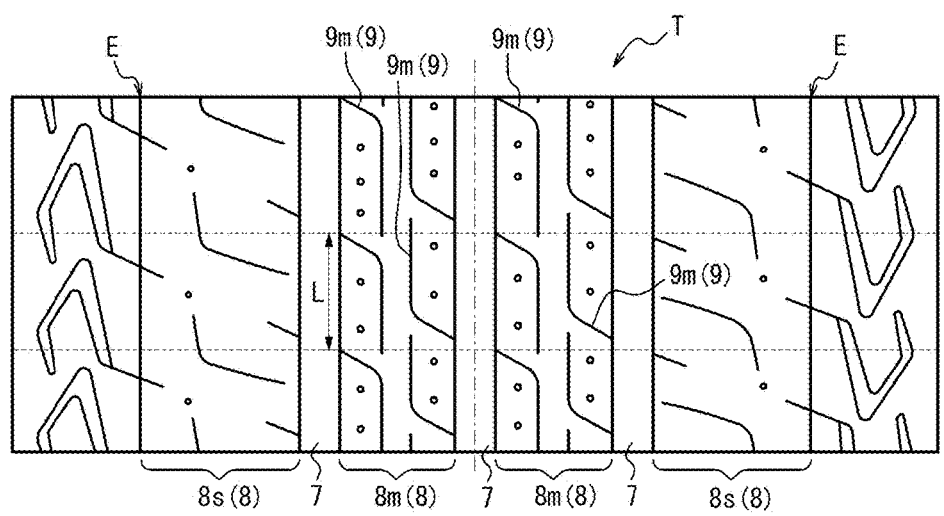
FIG. 4 is a developed view illustrating a modification of the tread pattern of the tire illustrated in FIG. 3.

The tire 1 in this embodiment may be modified as illustrated in FIG. 4. In detail, in the tire 1 illustrated in FIGS. 2 and 5, two circumferential main grooves 7 are provided in the tread surface T, and one center land portion 8c is defined by the two circumferential main grooves 7. In the tire 1 illustrated in FIG. 4, on the other hand, three circumferential main grooves 7 are provided in the tread surface T, and two land portions (hereafter also referred to as "intermediate land portions") 8m are defined by the three circumferential main grooves 7. While the pitch length L of the sipes 9 is unchanged in FIGS. 2 and 5, the pitch length L of the sipes 9 is changed in FIG. 4 as in FIG. 3.

In the tire 1 illustrated in FIG. 4, each intermediate land portion 8m has two rows of intermediate sipes 9m with the pitch length L that have the same structure as the center sipes 9c arranged in the center land portion 8c in the tire 1 illustrated in FIGS. 2 and 5. The intermediate sipes 9m of the respective rows differ in position from each other in the tire circumferential direction, and are point-symmetric.

The tire 1 illustrated in FIG. 4 has more circumferential main grooves 7 to form two intermediate land portions 8m in each of which the intermediate sipes 9m are arranged with the pitch length L (mm) and satisfy 0.4W≤Ws≤1.2W and 0.6L≤Ls≤3L, as compared with the tire 1 illustrated in FIGS. 2 and 5. Accordingly, while sufficiently maintaining the adhesion limit by suppressing a decrease in circumferential shearing rigidity, compression rigidity can be reduced to effectively improve the actual road footprint area. Wet performance can thus be improved.

Figure 6:
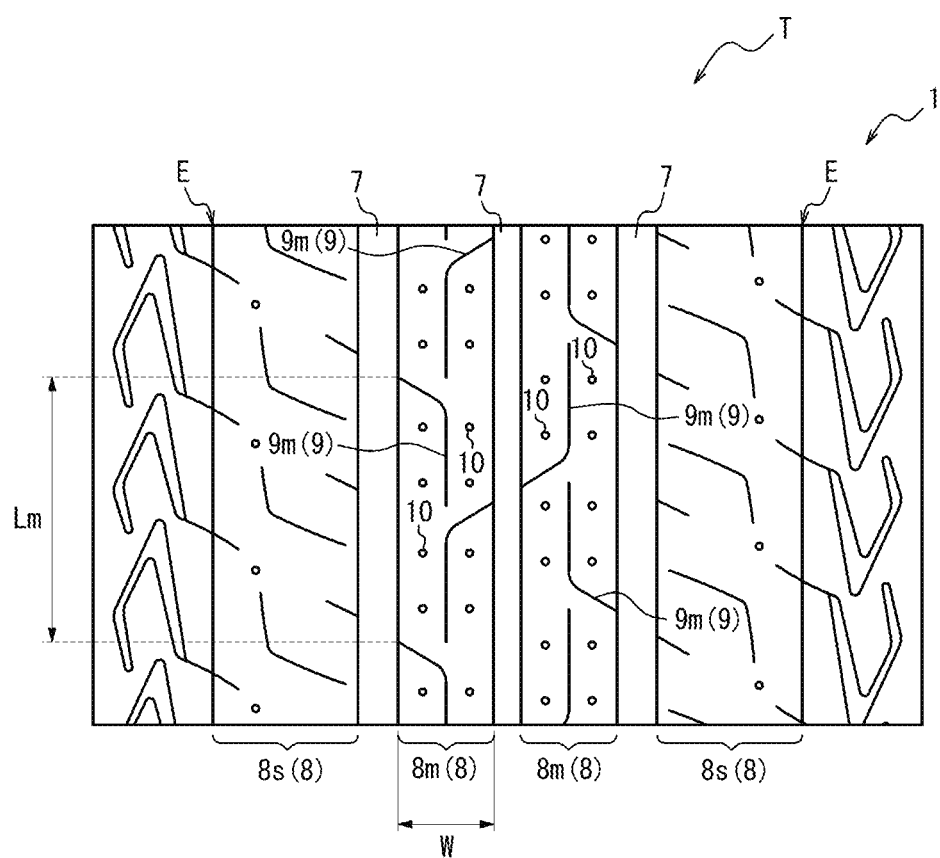
FIG. 6 is a developed view illustrating the tread pattern of a passenger vehicle pneumatic radial tire according to another one of the disclosed embodiments.

The following illustrates and describes a pneumatic tire according to another one of the disclosed embodiments, with reference to FIG. 6. In the following, the description of the same elements as those in the pneumatic tire according to the foregoing embodiment is omitted as appropriate.

In the tire 1 illustrated in FIG. 6, three circumferential main grooves 7 continuously extending in the tire circumferential direction are provided in the tread surface T. The tire 1 has two land portions 8 (intermediate land portions 8m) defined by the three circumferential main grooves 7, and land portions 8 (shoulder land portions 8s) located on the tire shoulder side of the tread surface T. Although the middle circumferential main groove 7 of the three circumferential main grooves 7 is narrower than the other two circumferential main grooves in this example, the circumferential main grooves 7 may have any groove width relationship.

In this embodiment, at least one intermediate land portion 8m (two intermediate land portions 8m in the illustrated example) has intermediate sipes 9m each of which includes: a tire widthwise portion that extends from the corresponding one of the circumferential main grooves 7 defining the intermediate land portion 8m while inclining with respect to the tire width direction and terminates within the land portion 8m; and a tire circumferential portion that extends in the tire circumferential direction from the end of the tire widthwise portion within the land portion 8c. A plurality of intermediate sipes 9m are arranged in the tire circumferential direction. In each intermediate sipe 9m, the tire circumferential portion is located at the center of the land portion 8m in the width direction, e.g. on the center line in the width direction in the illustrated example, and the tire widthwise portion extending in the tire width direction from the tire circumferential portion is open to one of the two circumferential main grooves 7 alternately. In other words, in this embodiment, intermediate sipes 9m open to different circumferential main grooves 7 alternate in the tire circumferential direction, where the tire circumferential portions of the respective intermediate sipes 9m are arranged in a line at the center of the land portion 8m in the tire width portion while being apart from each other in the tire circumferential direction.

Of the plurality of intermediate sipes 9m in one intermediate land portion 8m, the intermediate sipes 9m open to the same circumferential main groove 7 are arranged with the pitch length L (hereafter the pitch length of the sipes 9m is referred to as "pitch length Lm"). Although the tire 1 illustrated in FIG. 6 has a tread pattern in which the pitch length Lm of the intermediate sipes 9m is unchanged, a tread pattern in which the pitch length Lm is changed as illustrated in FIG. 3 as an example may be used.

In this embodiment, the land portion width W (mm) of the land portion 8m, the tire widthwise sipe component total length Ws (mm) of the sipes 9m within one pitch area of the pitch length Lm (mm) in the land portion, the pitch length Lm (mm), and the tire circumferential sipe component total length Ls (mm) of the sipes 9m within one pitch area of the pitch length Lm (mm) in the land portion satisfy the relationships 0.4W≤Ws≤1.2W and 0.6Lm≤Ls≤3Lm, as in the embodiment illustrated in FIG. 2.

In this embodiment, at least one small hole 10 is provided within one pitch area of the pitch length Lc (mm) in the intermediate land portion 8m, as in the embodiment illustrated in FIG. 2. In more detail, at least one small hole 10, e.g. two small holes 10 in the illustrated example, is provided on both sides of the tire circumferential portion of each intermediate sipe 9m in the width direction.

This embodiment has the same advantageous effects as the embodiment illustrated in FIG. 2. In addition, the tire circumferential portions of the respective intermediate sipes 9m are arranged in a line at the center of the land portion 8m in the tire width portion while being apart from each other in the tire circumferential direction. Thus, compression rigidity is sufficiently reduced while suppressing a decrease in circumferential shearing rigidity, and also rigidity in the width direction is maintained to sufficiently maintain cornering power. Moreover, in the case where there are two intermediate land portions 8m as in the illustrated example, a decrease in rigidity in the width direction can be suppressed sufficiently.

In the tire 1 illustrated in FIG. 6, three circumferential main grooves 7 are provided in the tread surface T, and two land portions 8m are defined by the three circumferential main grooves 7. Alternatively, in this embodiment, for example two circumferential main grooves 7 may be provided in the tread surface T, with the intermediate sipes 9m satisfying 0.4W≤Ws≤1.2W and 0.6L≤Ls≤3L being arranged in the land portion defined by the two circumferential main grooves 7.

While the disclosed embodiments have been described above with reference to drawings, the passenger vehicle pneumatic radial tire according to the disclosure is not limited to the foregoing examples, and may be changed as appropriate. For example, although the foregoing embodiments describe two rows of center sipes each of which includes the tire widthwise portion and the tire circumferential portion as the sipes that are arranged with the pitch length L and satisfy 0.4W≤Ws≤1.2W and 0.6L≤Ls≤3L in the center land portion, the shape of the center sipe is not limited to the one illustrated in FIGS. 2 and 5 as an example, and may be any shape such as zigzag or curved.

EXAMPLES

The disclosed techniques are described in more detail below using examples, although the disclosure is not limited to these examples.

To determine the advantageous effects according to the disclosure, the tires of Examples 1 to 6 and Comparative Examples 1 to 4 were experimentally produced.

Example 1

The tire of Example 1 is a tire of tire size 165/60R19 as illustrated in FIGS. 1 and 2. The tire has the specifications shown in Table 1, and two circumferential main grooves are provided in the tread surface T. In the tire of Example 1, in the center land portion defined by the two circumferential main grooves, a plurality of sipes (center sipes) are arranged with the predetermined pitch length L measured along the tire circumferential direction, and the land portion width W (mm) of the land portion, the tire widthwise sipe component total length Ws (mm) of the sipes within one pitch area of the pitch length L (mm) in the land portion, the pitch length L (mm), and the tire circumferential sipe component total length Ls (mm) of the sipes within one pitch area of the pitch length L (mm) in the land portion satisfy the relationships 0.4W≤Ws≤1.2W and 0.6L≤Ls≤3L. In the tire of Example 1, the average pitch length L of the sipes (center sipes) is 30 mm (1.4% of the tire circumferential length), and the land portion width W of the center land portion is 25 mm (19% of the tread width). The circumferential main grooves have a groove width of 9 mm and a groove depth of 7 mm, and the center sipes have a width of 0.7 min and a depth of 3 mm.

Examples 2 to 6

The tires of Examples 2 to 6 are the same as the tire of Example 1, except that the specifications are changed as shown in Table 1 and small holes are arranged.

Comparative Example 1

The tire of Comparative Example 1 is a tire with tire size 195/65R15. The tire has the specifications shown in Table 1, and three circumferential main grooves (groove width: 9 mm) are provided in the tread surface T. In the tire of Comparative Example 1, in two land portions adjacent to the circumferential main grooves located on the center side of the tread surface, a plurality of sipes (center sipes) are arranged with the predetermined pitch length L measured along the tire circumferential direction, and only the land portion width W (mm) of the land portion and the tire widthwise sipe component total length Ws (mm) of the sipes within one pitch area of the pitch length L (mm) in the land portion satisfy the relationship 0.4W≤Ws≤1.2W. In the tire of Comparative Example 1, the pitch length L of the sipes (center sipes) is 1.3% of the tire circumferential length, and the land portion width W of the center land portion is 18% of the tread width. The circumferential main grooves have a groove width of 9 mm and a groove depth of 6.5 mm, and the center sipes have a width of 0.5 mm and a depth of 5 mm.

Comparative Example 2

The tire of Comparative Example 2 is the same as the tire of Comparative Example 1, except that the tread rubber property is changed as shown in Table 1.

Comparative Examples 3 and 4

The tires of Comparative Examples 3 and 4 are the same as the tire of Example 1, except that the specifications are changed as shown in Table 1. In the tires of Comparative Examples 3 and 4, only the land portion width W (mm) of the land portion and the tire widthwise sipe component total length Ws (mm) of the Sipes within one pitch area of the pitch length L (mm) in the land portion satisfy the relationship 0.4W≤Ws≤1.2W.

Each of these sample tires was evaluated by the following methods.

[Wet Performance]

Each sample tire was attached to a rim and filled to an internal pressure under the below-mentioned condition. The sample tire was mounted on a vehicle, and run on a wet road surface at 80 km/h. The stopping distance (m) upon full brake application after running in this state was measured, and the average deceleration $(m/s^2)=V2/25.92$ L was calculated (wet coefficient of friction (wet μ)). The evaluation result was indicated by an index with the tire of Comparative Example 1 being set to 100. A higher index indicates higher wet performance.

Examples 1 to 6, Comparative Examples 3 to 4: rim size 5.5J-19, internal pressure 300 kPa Comparative Examples 1 and 2: rim size 6.5J-15, internal pressure 220 kPa

[Rolling Resistance Performance]

Each sample tire was attached to a rim and filled to an internal pressure under the same condition as the wet performance measurement condition. The sample tire was placed under the maximum load prescribed for the tire, and the rolling resistance coefficient was measured under the condition of a drum rotational velocity of 100 km/h.

The evaluation result was indicated by an index with the tire of Comparative Example 1 being set to 100, using the inverse of the value of the sample tire. A higher index indicates higher rolling resistance performance.

[Cornering Power]

Cornering power was measured using a flat-belt cornering tester. In detail, each sample tire was attached to a rim and filled to an internal pressure under the same condition as the wet performance measurement condition, and the flat-belt cornering tester is attached to the sample tire to perform the measurement. At a belt speed of 100 km/h, the cornering force was measured in the state where the slip angle (SA) with the circumferential direction of the rolling direction drum of the tire was 1°.

The evaluation result was indicated by an index with the cornering force of Comparative Example 1 being set to 100.

A higher index indicates a higher cornering force at the slip angle, that is, higher cornering power at the slip angle.

The dynamic storage modulus E' and the loss tangent tan δ were measured using a Spectrometer made by Toyo Seiki Seisaku-sho, Ltd., by applying an initial load of 160 g to a test piece of 2 mm in thickness, 5 mm in width, and 20 mm in length under the conditions of an initial strain of 1% and a vibration frequency of 50 Hz. The dynamic storage modulus E' was measured at 30° C., and the loss tangent tan δ was measured at 0° C. and 60° C.

TABLE 1

|  | Comparative Example 1 | Comparative Example 2 | Comparative Example 3 | Comparative Example 4 | Example 1 |
|---|---|---|---|---|---|
| Tire size | 195/65R15 | 195/65R15 | 165/60R19 | 165/60R19 | 165/60R19 |
| Dynamic storage modulus E' of bead rubber at 30° C. (MPa) | 5.4 | 7.2 | 5.4 | 7.2 | 7.2 |
| tanδ of tread rubber at 60° C. | 0.12 | 0.12 | 0.12 | 0.12 | 0.12 |
| Pitch length L of sipe W (mm) | 30 | 30 | 30 | 30 | 30 |
| Land position width W (mm) | 30 | 30 | 25 | 25 | 25 |
| Tire circumferential sipe component total length La (mm) | 15(0.5 L) | 15(0.5 L) | 15(0.5 L) | 15(0.5 L) | 60(2 L) |
| Tire widthwise sipe component total length Wa (mm) | 45(1.5 W) | 45(1.5 W) | 37.5(1.5 W) | 37.5(1.5 W) | 20(0.8 W) |
| Small hole  Number N | — | — | — | — | — |
| Opening area S ($mm^2$) | — | — | — | — | — |
| N/L (number/mm) | — | — | — | — | — |
| Tread width (mm) | 145 | 145 | 125 | 125 | 125 |
| Wet cofficient of friction μ | 100 | 99 | 163 | 107 | 110 |
| Rolling resistance | 100 | 96 | 130 | 135 | 135 |
| Connecting power | 100 | 105 | 116 | 110 | 120 |

|  | Example 2 | Example 3 | Example 4 | Example 5 | Example 6 |
|---|---|---|---|---|---|
| Tire size | 165/60R19 | 165/60R19 | 165/60R19 | 165/60R19 | 165/60R19 |
| Dynamic storage modulus E' of bead rubber at 30° C. (MPa) | 7.2 | 7.2 | 7.2 | 7.2 | 7.2 |
| tanδ of tread rubber at 60° C. | 0.12 | 0.12 | 0.12 | 0.12 | 0.12 |
| Pitch length L of sipe W (mm) | 30 | 30 | 30 | 30 | 30 |
| Land position width W (mm) | 25 | 25 | 25 | 25 | 25 |
| Tire circumferential sipe component total length La (mm) | 60(2 L) | 60(2 L) | 60(2 L) | 60(2 L) | 60(2 L) |
| Tire widthwise sipe component total length Wa (mm) | 20(0.8 W) | 20(0.8 W) | 20(0.8 W) | 20(0.8 W) | 20(0.8 W) |
| Small hole  Number N | 6 | 6 | 6 | 2 | 18 |
| Opening area S ($mm^2$) | 176 | 0.05 | 5 | 1.76 | 1.76 |
| N/L (number/mm) | 0.2 | 0.2 | 0.2 | 0.07 | 0.6 |
| Tread width (mm) | 125 | 125 | 125 | 125 | 125 |
| Wet cofficient of friction μ | 112 | 116 | 110 | 110 | 116 |
| Rolling resistance | 135 | 135 | 133 | 135 | 135 |
| Connecting power | 120 | 120 | 120 | 120 | 118 |

As shown in Table 1, Examples 1 to 6 had improved wet performance and rolling resistance performance as compared with the tires of Comparative Examples 1 to 4.

INDUSTRIAL APPLICABILITY

It is thus possible to provide a passenger vehicle pneumatic radial tire that achieves improved wet performance and rolling resistance performance in a narrow-width, large-diameter radial tire.

REFERENCE SIGNS LIST 1 passenger vehicle pneumatic radial tire
2 bead portion
3 carcass
4 tread rubber
5 tread portion
6 sidewall portion
7 circumferential main groove
8 land portion
8c center land portion
8s shoulder land portion
8m intermediate land portion
9 sipe
9c center sipe
9s shoulder sipe
9s1 first shoulder sipe
9s2 second shoulder sipe
9s3 third shoulder sipe
9m intermediate sipe
10 small hole
T tread surface
E tread ground contact edge
L pitch length
Lc pitch length of sipes in center land portion
Lsho pitch length of sipes in shoulder land portion
W land portion width
P1 to P3 pattern

The invention claimed is:
1. A passenger vehicle pneumatic radial tire comprising:
a carcass composed of a carcass ply of a radially arranged cord toroidally extending between a pair of bead portions;
a tread rubber provided on a tire radial outer side of the carcass;
at least two circumferential main grooves continuously extending in a tire circumferential direction in a tread surface; and a plurality of land portions in the tread surface, each of which is defined by adjacent two circumferential main grooves of the at least two circumferential main grooves or by a tire widthwise outermost circumferential main groove of the at least two circumferential main grooves and a tread ground contact edge, wherein:

when the tire is attached to a rim and set to an internal pressure of 250 kPa or more, a ratio SW/OD between a sectional width SW and an outer diameter OD (mm) of the tire is 0.26 or less in the case where the sectional width SW of the tire is less than 165 (mm), and the sectional width SW and the outer diameter OD (mm) of the tire satisfy a relationship $2.135 \times SW+282.3 \leq OD$ in the case where the sectional width SW of the tire is 165 (mm) or more, the tread rubber has dynamic storage modulus E' at 30° C. of 6.0 MPa to 12.0 MPa, and loss tangent tan δ at 60° C. of 0.05 to 0.15, in at least one of the plurality of land portions, a plurality of sipes are arranged with a predetermined pitch length L (mm) measured along the tire circumferential direction, and a land portion width W (mm) of the land portion, a tire widthwise sipe component total length Ws (mm) of the sipes within one pitch area of the pitch length L (mm) in the land portion, the pitch length L (mm), and a tire circumferential sipe component total length Ls (mm) of the sipes within one pitch area of the pitch length L (mm) in the land portion satisfy relationships $0.4W \leq Ws \leq 1.2W$ and $0.6L \leq Ls \leq 3L$, and the tire further comprises a center land portion located on the tire equator, and in the center land portion, Ws and Ls satisfy the relationships:

$0.4W \leq Ws \leq 1.2W$ and $0.6L \leq Ls \leq 3L$.

2. The passenger vehicle pneumatic radial tire according to claim 1, wherein the land portion width W (mm), the tire widthwise sipe component total length Ws (mm), the pitch length L (mm), and the tire circumferential sipe component total length Ls (mm) satisfy relationships $0.6W \leq Ws \leq 1.2W$ and $L \leq Ls \leq 3L$.

3. The passenger vehicle pneumatic radial tire according to claim 1, wherein in the land portion in which the sipes are arranged, at least one small hole is provided within one pitch area of the pitch length L (mm), and an opening area S (mm$^2$) of the small hole to the tread surface is $0.1 \leq S \leq 4$.

4. The passenger vehicle pneumatic radial tire according to claim 3, wherein in the land portion in which the sipes are arranged, the pitch length L (mm) and the number N of small holes provided within one pitch area of the pitch length L (mm) satisfy a relationship $0.1 \leq N/L \leq 0.3$.

5. The passenger vehicle pneumatic radial tire according to claim 2, wherein in the land portion in which the sipes are arranged, at least one small hole is provided within one pitch area of the pitch length L (mm), and an opening area S (mm$^2$) of the small hole to the tread surface is $0.1 \leq S \leq 4$.

6. The passenger vehicle pneumatic radial tire according to claim 5, wherein in the land portion in which the sipes are arranged, the pitch length L (mm) and the number N of small holes provided within one pitch area of the pitch length L (mm) satisfy a relationship $0.1 \leq N/L \leq 0.3$.

7. The passenger vehicle pneumatic radial tire according to claim 1, wherein the sipes in the center land portion include two rows, the two row differ in position from each other in the tire circumferential direction, and are point-symmetric.

8. The passenger vehicle pneumatic radial tire according to claim 1, wherein the tire comprises a shoulder land portion, the shoulder land portion has first shoulder sipes and second shoulder sipes, and wherein the tire widthwise portion of the sipes in the center land portion and the first shoulder sipe and the second shoulder sipe in each shoulder land portion are collinear.

9. The passenger vehicle pneumatic radial tire according to claim 1, wherein the tire comprises a shoulder land portion, the shoulder land portion has first shoulder sipes, second shoulder sipes, and third shoulder sipes, and wherein the tire widthwise portion of each third shoulder sipe is located at the center between the first shoulder sipes adjacent in the tire circumferential direction and between the second shoulder sipes adjacent in the tire circumferential direction.

* * * * *